United States Patent [19]

Vogt et al.

[11] Patent Number: 4,689,058
[45] Date of Patent: Aug. 25, 1987

[54] DISPOSABLE STOVE HOOD FILTER

[75] Inventors: Clifford M. Vogt, Roswell; Peter W. Shipp, Jr., Woodstock; Cynthia C. Pendley, Norcross, all of Ga.

[73] Assignee: Kimberly-Clark Corporation, Neenah, Wis.

[21] Appl. No.: 827,293

[22] Filed: Feb. 7, 1986

[51] Int. Cl.$^4$ .............................................. B01D 46/02
[52] U.S. Cl. ..................................... 55/279; 55/316; 55/486; 55/501; 55/511; 55/525; 55/528; 55/529; 55/524; 55/DIG. 31
[58] Field of Search ................. 55/279, 316, 378, 486, 55/487, 490, 501, 528, 529, 511, 524, 525, DIG.31, DIG.36; 126/299 F

[56] References Cited

U.S. PATENT DOCUMENTS

| | | | |
|---|---|---|---|
| Re. 29,410 | 9/1977 | Yoshino | 55/316 |
| 1,147,279 | 7/1915 | Sweetland | 55/525 |
| 2,008,067 | 7/1935 | Faber | 55/279 |
| 3,127,259 | 3/1964 | Boylan | 55/511 |
| 3,474,599 | 10/1969 | Schwab | 55/497 |
| 3,528,390 | 9/1970 | Lee | 119/15 |
| 3,660,969 | 5/1972 | Fox | 55/385 |
| 3,854,912 | 12/1974 | Terrel et al. | 55/479 |
| 3,971,877 | 7/1976 | Lee | 55/509 |
| 4,198,726 | 4/1980 | Powell | 55/509 |
| 4,211,661 | 7/1980 | Perry | 210/491 |
| 4,217,386 | 8/1980 | Arons et al. | 428/198 |
| 4,292,061 | 9/1981 | Land | 55/507 |
| 4,340,402 | 7/1982 | Catron | 55/501 |
| 4,518,402 | 5/1985 | Dargel | 55/103 |
| 4,540,625 | 9/1985 | Sherwood | 55/524 |
| 4,589,894 | 5/1986 | Gin | 55/487 |

FOREIGN PATENT DOCUMENTS 2506520 8/1976 Fed. Rep. of Germany ........ 55/279
2157586 10/1985 United Kingdom ................. 55/528

Primary Examiner—Bernard Nozick
Attorney, Agent, or Firm—William D. Herrick

[57] ABSTRACT

A composite stove hood filter consists of a primary metal mesh filter and a nonwoven, secondary disposable filter. The secondary filter is a low basis weight (0.2 oz./yd.$^2$ to 1.0 oz./yd.$^2$) spun-bonded polymer sheet which is attached to the primary filter by means of elastic bands or Velcro strips. A patch of melt-blown polymer material, impregnated with air freshener, may be attached to the spun-bonded sheet of the secondary filter to freshen the air as it is filtered.

11 Claims, 3 Drawing Figures

DISPOSABLE STOVE HOOD FILTER

BACKGROUND OF THE INVENTION

This invention relates generally to disposable filters, and more particularly concerns nonwoven, secondary disposable filters for use with the standard metal filters found on conventional stove hoods.

Stoves and cooking ranges are frequently provided with exhaust hoods including a fan which draws the cooking fumes from the area above the cooking surface, filters out grease and smoke particles, and exhausts the filtered fumes either outside of the dwelling or back into the room. If the cooking oils and greases are not filtered out of the air, they will deposit on the surfaces of the hood, the exhaust fan, and the ducts leading to outside the dwelling. Over time, such layer of grease is not only source of objectional odors and filth, but it also represents a fire hazard.

Conventionally, the filters used on stove hoods have been formed of aluminum or other expanded metal mesh. Such filters rely totally on the impaction of oil and grease particles on the surface of the metal lattice which has pore sizes of approximately $\frac{1}{8}$ of an inch. Because such metal lattic filters are reasonably expensive, they are intended to be cleaned and reused and not simply thrown away. Cleaning accumulated grease and oil from the surface of such metal filters is both a time consuming and unpleasant task which requires soaking the filter in a suitable cleaning agent to loosen and dissolve the accumulated grease.

In addition, for those stove hoods which filter the fumes and exhaust the filtered air back into the room, such metal filters, which rely solely on impaction, cannot move the smaller smoke particulate which may be part of the cooking fumes.

Dargel U.S. Pat. No. 4,518,402 discloses a reusable air filter system for air conditioners, furnaces, and grease hoods. The filter element consists of fine mesh polypropylene in the form of sheets. Two sheets, preferably 12 mils in thickness, are provided at the upstream side and the downstream side of the filter element. Between the two upstream side sheets and the two downstream side sheets lies a three-dimensional layer of polypropylene which is 20 mils in thickness and which folds over on itself to form a generally U-shaped filtering stage with a gap therebetween. The polypropylene sheets are permanently fitted within a metal frame and protected by a metal grating. The filter system is cleanable and reusable.

Terrel et al. U.S. Pat. No. 3,854,912 discloses a self-contained unitary filter element including both a grease trap type air filter and an air cleansing or purifying filter. The grease trap member is a dished receptacle constructed of a plurality of metal layers such as expanded aluminum which provide a tortuous path through the various layers, thereby trapping the grease by impaction. The air cleansing filter consists of loose particulate charcoal granules simply poured into the dish-shaped grease trap. Alternatively, a bag-like cover may be used to enclose the charcoal granules when placed within the dish-shaped grease filter.

Arons et al. U.S. Pat. No. 4,217,386 discloses laminated fabric including activated carbon fabric for cleansing air of toxic chemical vapors. The laminate is formed of consecutive layers of spun-bond polyolefin material, melt-blown polyolefin materials, a woven active carbon fabric, melt-blown polyolefin material, and spun-bond polyolefin material. The spun-bond and melt-blown materials are laminated together and have a combined basis weight of 1.5 oz./yd$^2$.

Sherwood U.S. Pat. No. 4,540,625 discloses a polypropylene fabric formed by a process involving the cooling and agitation of the polymer solution while subjecting the solution to the application of sonic vibrations. The resulting polypropylene fabric is impregnated with solid particles of activated charcoal positioned within the intersticial spaces between the nonwoven fabric.

Boylan U.S. Pat. No. 3,127,259 discloses a frame to which a filter element may be attached and detached by means of a zipper, tape, or Velcro tape.

The prior art thus does not provide a nonwoven, disposable secondary filter which is easily attachable and detachable from the primary metal lattice filter of a stove hood.

SUMMARY OF THE INVENTION

It is therefore an object of the present invention to provide a composite stove hood filter comprising a primary filter consisting of a metal mesh filter element and a nonwoven, secondary disposable filter which will increase the efficiency of the primary filter by not only removing oil and grease from the cooking fumes but also removing much smaller particulate smoke particles.

It is likewise an object of the present invention to provide a nonwoven, secondary disposable filter which is low in cost so that when it becomes laden with oil and grease or particulate matter, it can be simply thrown away.

It is similarly an object of the present invention to provide a nonwoven, secondary disposable filter which includes portions impregnated with activated charcoal or fragrances for removing and masking cooking odors.

In accordance with the above objectives, it is also an object of the present invention to provide a simple attachment system for the nonwoven, secondary disposable filter so that it may be attached on the upstream side of the metal lattice filter quickly and easily.

In order to realize the above-identified objectives, a nonwoven web of spun-bonded hydrocarbon based polymer, such as polypropylene, is attached to the metal filter on its upstream side. The spun-bonded web is of low basis weight (about 0.2 oz./yd.$^2$ to 1.0 oz/yd.$^2$) and is very uniform in terms of fiber size and pore size. In addition, patches of melt-blown polymer material impregnated with an air freshener, such as activated charcoal or fragrances, may be bonded to the secondary filter to further freshen air where the stove hood exhausts the filtered air back into the room.

Other objects and advantages of the invention will become apparent upon reading the following detailed description and upon reference to the drawings.

DETAILED DESCRIPTION OF THE INVENTION

While the invention will be described in connection with the preferred embodiment, it will be understood that we do not intend to limit the invention to that embodiment. On the contrary, we intend to cover all alternatives, modifications, and equivalents as may be included within the spirit and scope of the invention as defined by the appended claims.

Figure 1:
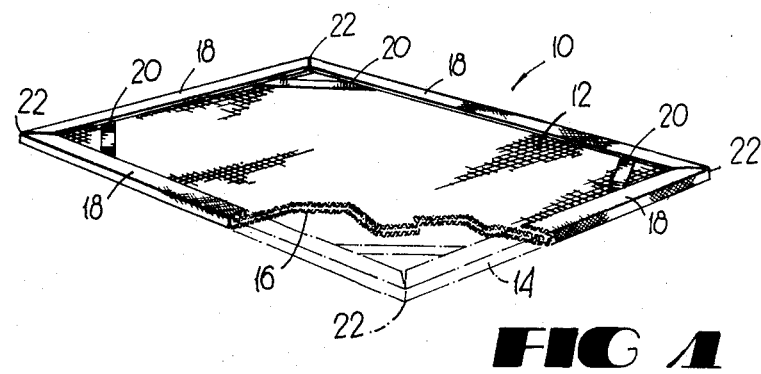
FIG. 1 is a perspective view showing the secondary filter of the present invention attached to a standard rectangular metal filter.

Turning to FIG. 1, there is shown a standard stove hood filter 10 which consists of a rectangular metal frame 14 and a metal mesh filter element 12. In FIG. 1, the stove hood filter 10 is shown from the back (downstream side).

In order to increase the efficiency of the metal mesh filter element 12 of the standard stove hood filter 10, a nonwoven, secondary disposable filter 16 in the form of a sheet is stretched across the front (upstream side) of the metal mesh filter element. The nonwoven filter 16 is slightly larger in dimension than the rectangular frame 14 of the stove hood filter 10 so that its edges 18 can wrap around the edges of the frame 14 and overlap a portion of the back (downstream) side of the stove hood filter 10.

In order to secure the nonwoven filter element 16 onto the metal frame 14, elastic bands 20 are attached diagonally across the corners 22 to adjacent edges 18 of the filter 16. The elastic bands 20, stretched diagonally across the corners 22 between adjacent edges 18, hold the edges 18 in their wrapped-around configuration at the back (downstream) side of the filter frame 14. Because the non-woven filter 16 is stretched across the front (upstream) side of the metal mesh filter, the pressure created by the stove hood fan (not shown) tends to hold the nonwoven filter 16 against the metal mesh filter element 12 during operation of the stove hood.

Figure 2:
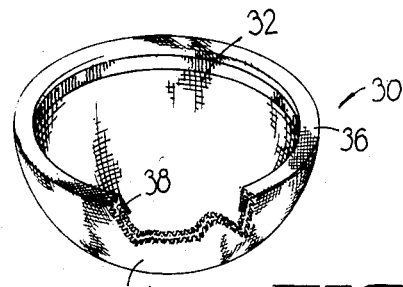
FIG. 2 is a perspective view showing the secondary filter of the present invention attached to a metal filter of the type which is in the shape of a basket.

Turning to FIG. 2, there is shown a basket-shaped stove hood filter 30 which consists of a metal mesh filter element 32 formed into the shape of a basket. A nonwoven secondary disposable filter 34 in the form of a generally round sheet is stretched over the concave (upstream) surface of the metal mesh basket 32 and overlapped around the edge 36 of the basket. The filter 34 has an elastic band 38 integrally formed with the filter 34 around its periphery. Once the filter 34 is stretched over the concave (upstream) side of the basket 38 and over the edge 36, the elastic band 38 around the periphery of the nonwoven filter 34 holds the nonwoven filter 34 in place. Again, because of the air pressure created by the stove hood exhaust fan, the nonwoven filter 34 tends to be held against the metal mesh filter element 32 during operation.

Figure 3:
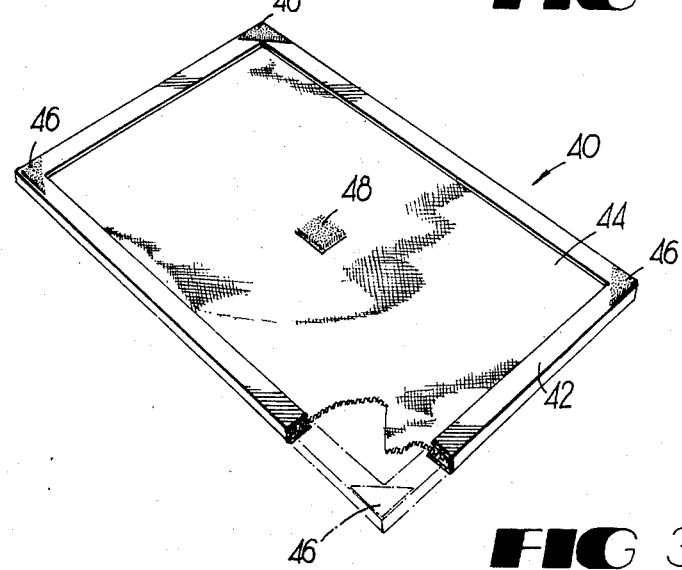
FIG. 3 shows the upstream side of a standard rectangular metal filter with alternative attachment means provided for attachment of the secondary filter of the present invention.

Turning of FIG. 3, there is shown a standard rectangular stove hood filter 40 having a metal frame 42 and a metal mesh filter element 44. Male Velcro strips 46 are adhesively attached to the corners of the metal frame on the front (upstream) side of the stove hood filter 40. In addition, a male Velcro strip 48 is attached to the middle of the metal mesh filter element 44 on the face of the stove hood filter 40 either adhesively or by means of a string or wire, for example. Because of the nature of the nonwoven materials used for the secondary disposable filter, which material will be described in greater detail below, the material itself becomes entangled with the male Velcro strips so that a rectangular sheet of the nonwoven filter element can be pressed against the Velcro strips 46 and 48 and thereby be held in place on the face (upstream) side of the metal mesh filter. Again, because the secondary nonwoven filter is on the upstream side of the metal filter, the air pressure created by the exhaust fan in the stove hood tends to hold the nonwoven filter in place instead of pulling it away from the Velcro strips 46 and 48.

We have found that the nonwoven, secondary disposable filter is most advantageously made of a nonwoven spun-bonded hydrocarbon based polymer which can be spun into fibers to form a web having a basis weight of about 0.02 oz./yd.$^2$ to 1.0 oz./yd.$^2$ and having filaments of from about 1 denier to 3 denier. The spun-bonded material is made in accordance with standard practice for manufacturing spun-bonded materials of such basis weight and denier which practice is well known in the art. Polymers which are useful in carrying out the invention may include polyester, polyethylene, nylon, and polypropylene. Polypropylene is preferred. The webs should in addition be uniform in fiber size and pore size.

Because the nonwoven, secondary disposable filter is applied to the standard metal mesh filter on the front (upstream) side of the metal mesh filter, the nonwoven, secondary disposable filter traps the grease and cooking oils in the cooking fumes before the grease and oil reach the metal mesh filter. In addition, the nonwoven spun-bonded material also has the ability to filter out smoke particles that may be contained in the cooking fumes, thus clearing the air of such particles.

Once the nonwoven, secondary disposable filter has become laden with grease and smoke particulates, the secondary filter element is simply removed from the standard stove hood filter and thrown away.

In addition to a single layer of spun-bonded material as previously described, an additional layer of melt-blown polymer material may be attached to the spun-bonded material. The melt-blown material is impregnated with an air freshener, such as activated charcoal and/or fragrances, in order to remove odors from the cooking fumes if the air is to then be exhausted back into the room. We have found that a polypropylene melt-blown fabric of about 2 oz./yd.$^2$ impregnated with activated charcoal and/or fragrances therein during the melt-blowing process can be sonically welded over a portion of the face of the spun-bonded material to provide the desirable air freshening capability. Other methods of attaching the melt-blown material to the spun-bonded may include heat welding and/or depositing the melt-blown material directly onto the spun-bonded material during the manufacturing process for the spun-bonded material. In addition other hydrocarbon based polymers that can be melt-blown into fibrous webs may be used to carry out the invention and may include polyester, polyethylene, and nylon.

The pattern of melt-blown material on the spun-bonded material can be circular in shape, oval in shape, or composed of lines or strips. The oval pattern appears to promote air turbulence during filtration and thus better filter efficiency.

We claim:

1. A composite stove hood filter having a front upstream side and a back downstream side comprising a primary filter consisting of a sheet of metal filter mesh carried by a rectangular frame and covering the opening of said frame and a nonwoven fiber, secondary filter consisting essentially of a hydrocarbon based nonwoven fiber web stretched across the front side of the metal mesh and secured on the back side of the frame by elastic band means.

2. The composite stove hood filter of claim 1, wherein the nonwoven, secondary filter element is a spun-bonded polymer web having a basis weight of about 0.2 oz./yd.$^2$ to 1.0 oz./yd.$^2$.

3. The composite stove hood filter of claim 2, wherein a patch of melt-blown polymer material impregnated with an air freshener is attached to the nonwoven, secondary filter element.

4. The composite stove hood filter of claim 3, wherein the spun-bonded polymer web is formed from a polymer selected from the group consisting of polyester, polyethylene, nylon, and polypropylene and the melt-blown polymer material is formed from a polymer selected from the group consisting of polyester, polyethylene, nylon, and polypropylene.

5. A composite stove hood filter having a convex front upstream side and a concave back downstream side comprising a primary filter consisting of a basket-shaped metal filter mesh and a nonwoven fiber, secondary filter consisting essentially of a hydrocarbon based nonwoven fiber web stretched across and covering the convex front side of the primary filter and secured around the back side of the primary filter by elastic band means.

6. The composite stove hood filter of claim 5, wherein the nonwoven, secondary filter element is a spun-bonded polymer web having a basis weight of about 0.2 oz./yd.$^2$ to 1.0 oz./yd.$^2$.

7. The composite stove hood filter of claim 6, wherein a patch of melt-blown polymer material impregnated with an air freshener is attached to the nonwoven, secondary filter element.

8. The composite stove hood filter of claim 7, wherein the spun-bonded polymer web is formed from a polymer selected from the group consisting of polyester, polyethylene, nylon, and polypropylene and the melt-blown polymer material is formed from a polymer selected from the group consisting of polyester, polyethylene, nylon, and polypropylene.

9. A nonwoven, secondary disposable filter for attachment to a primary metal mesh filter of a stove hood, a nonwoven, the secondary disposable filter comprising a rectangular sheet having elastic band means diagonally attached to adjacent edges and said sheet comprising a spunbonded polymer having a basis weight of about 0.2 oz./yd$^2$ to 1.0 oz./yd$^2$ and having a patch of meltblown polymer material attached thereto, wherein the meltblown polymer material path is impregnated with an air freshener.

10. A nonwoven, secondary disposable filter for attachment to a primary metal mesh filter of a stove hood, the nonwoven, secondary disposable filter comprising a round sheet having elastic means around its periphery, said sheet comprising a spunbonded polymer having a basis weight of about 0.2 oz./yd$^2$ to 1.0 oz./yd$^2$ and having a patch of meltblown polymer material attached thereto, wherein the meltblown polymer material patch is impregnated with an air freshener.

11. The nonwoven, secondary disposable filter of claim 9 or 10 wherein the spun-bonded polymer web is formed from a polymer selected from the group consisting of polyester, polyethylene, nylon, and polypropylene and the melt-blown polymer material is formed from a polymer selected from the group consisting of polyester, polyethylene, nylon, and polypropylene.

* * * * *